(12) United States Patent
Dwyer et al.

(10) Patent No.: US 7,073,041 B2
(45) Date of Patent: Jul. 4, 2006

(54) VIRTUAL MEMORY TRANSLATION UNIT FOR MULTIMEDIA ACCELERATORS

(75) Inventors: Malcolm Ryle Dwyer, Glendale Heights, IL (US); Nikolaos Bellas, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 200 days.

(21) Appl. No.: 10/285,153

(22) Filed: Oct. 30, 2002

(65) Prior Publication Data

US 2004/0088516 A1    May 6, 2004

(51) Int. Cl.
*G06F 12/00* (2006.01)
(52) U.S. Cl. ..................................... 711/203
(58) Field of Classification Search ............. 711/202, 711/203, 218; 345/540, 564, 568, 569
See application file for complete search history.

(56) References Cited

U.S. PATENT DOCUMENTS

| 5,247,632 | A | 9/1993 | Newman ............... 395/400 |
| 5,659,714 | A | 8/1997 | Yoshida ............... 395/497.1 |
| 6,563,507 | B1 * | 5/2003 | Ito ....................... 345/569 |
| 6,859,208 | B1 * | 2/2005 | White ................... 345/557 |
| 6,868,123 | B1 | 3/2005 | Bellas et al. |
| 2003/0142102 | A1 * | 7/2003 | Emberling et al. ..... 345/540 |

\* cited by examiner

*Primary Examiner*—Pierre M. Vital

(57) ABSTRACT

A method and system for virtual memory translation of data represented in a multidimensional coordinate system when the physical memory may be located in more than one physical memory location. The translation of one or more virtual addresses into one or more accesses to one or more physical memories is achieved by representing each address of each element of a memory of the one or more physical memories as a point in a Cartesian coordinate system wherein consecutive points in the Cartesian coordinate system represent virtual memory addresses corresponding to elements from different physical memories of the one or more physical memories. Points in the Cartesian coordinate system are translated into one or more corresponding physical memory addresses, and read or write operations may be performed relative to these physical memory addresses. Multiple read or write operations may be performed during a single clock cycle through the use of parallel accesses of the one or more physical memories. Alternatively, multiple read or write operations may be performed in a pipelined architecture.

26 Claims, 5 Drawing Sheets

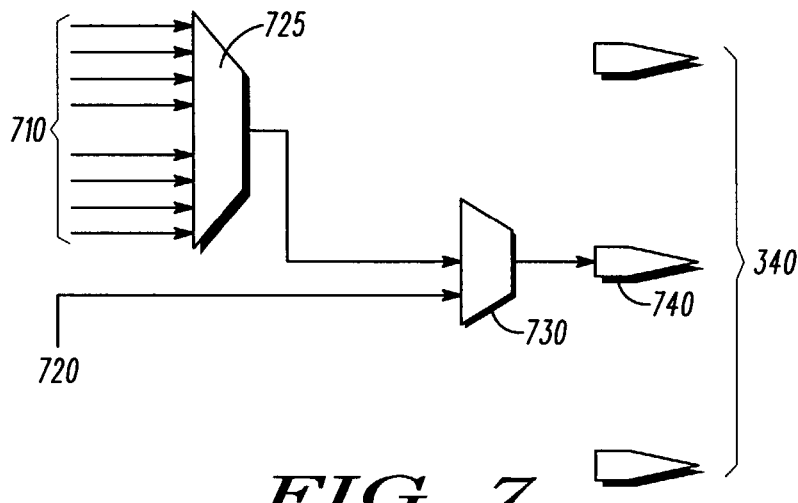
FIG. 7
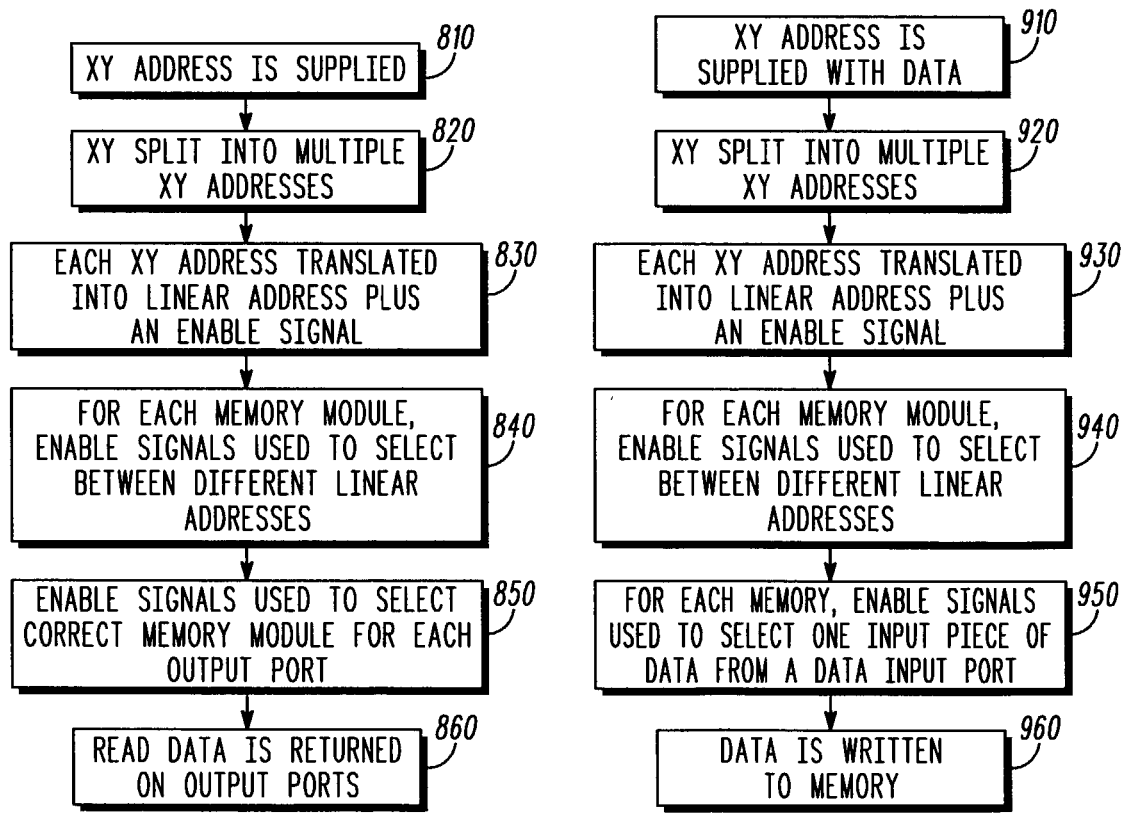
FIG. 8
FIG. 9

VIRTUAL MEMORY TRANSLATION UNIT FOR MULTIMEDIA ACCELERATORS

TECHNICAL FIELD

This invention relates generally to the field of multidimensional digital data processing, and more specifically to the use of memory translation devices when multiple memory modules are present.

BACKGROUND OF THE INVENTION

In hardware for performing multimedia signal processing, there may be multiple memory modules that contain the data required for multimedia signal processing operations. Because the data may be stored in more than one memory module, there are programmatic issues related to retrieving the data in a fast and efficient manner. The data required for a multimedia application may be located in more than one memory module because of the requirements for the data storage, or because of bandwidth limitations of the multimedia signal processing system.

Referring to FIG. 1, a general multimedia signal processing architecture 100 is shown, according to the prior art. An input/output module 110 forwards data to multimedia processor 120, and also receives processed data from multimedia processor 120. Multimedia processor 120 performs signal processing operations on input data and stores the results in one or more memory modules 150. The input data to multimedia processor 120 may originate from input/output module 110 or from the one or more memory modules 150. A processor/memory interface 130 handles the interactions between the one or more memory modules 150 and the multimedia processor 120. The functionality of processor/memory interface 130 can become complicated when multimedia processor 120 requires data that is stored in more than one memory module (for example memory module 135 and memory module 140). Accessing data stored in more than one memory module can increase the coding required in processor/memory interface 130, and can increase application complexity.

An example of a system that stores data in multiple memory modules due to bandwidth limitations is a motion estimating unit in a video encoding application. In this application, pixel data have to be stored in multiple memory modules in order to increase the bandwidth of the data transferred to the motion estimation unit. In this example, as well as other applications, it is desirable to achieve multiple memory accesses per clock cycle. This design consideration impacts the design of the interface between the multimedia processing and the memory modules since coding efficiency is related to the number of parallel memory fetches that can occur within a single clock cycle.

A programmatic approach that abstracts the interface to a plurality of memory modules so that multiple memory modules which may contain heterogeneous data could be accessed by reusing the same section of code would be advantageous. It would also be advantageous if this section of code could be executed within a single clock cycle, and would further remove the physical addresses of the plurality of memory modules from the multimedia processor. A common approach to abstracting the plurality of physical addresses is to use a virtual address translation application that is part of the processor/memory interface. Virtual address translation allows the multimedia processor to represent the plurality of memory modules using a convenient representation which is translated to the physical addresses of the data contained in memory as necessary.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 7 is a schematic diagram of the output logic coupled to the plurality of memory modules, according to a certain embodiment of the present invention.

FIG. 8 is a flow diagram of a VMTU read operation, according to a certain embodiment of the present invention.

FIG. 9 is a flow diagram of a VMTU write operation, according to a certain embodiment of the present invention.

DETAILED DESCRIPTION OF THE INVENTION

Figure 1:
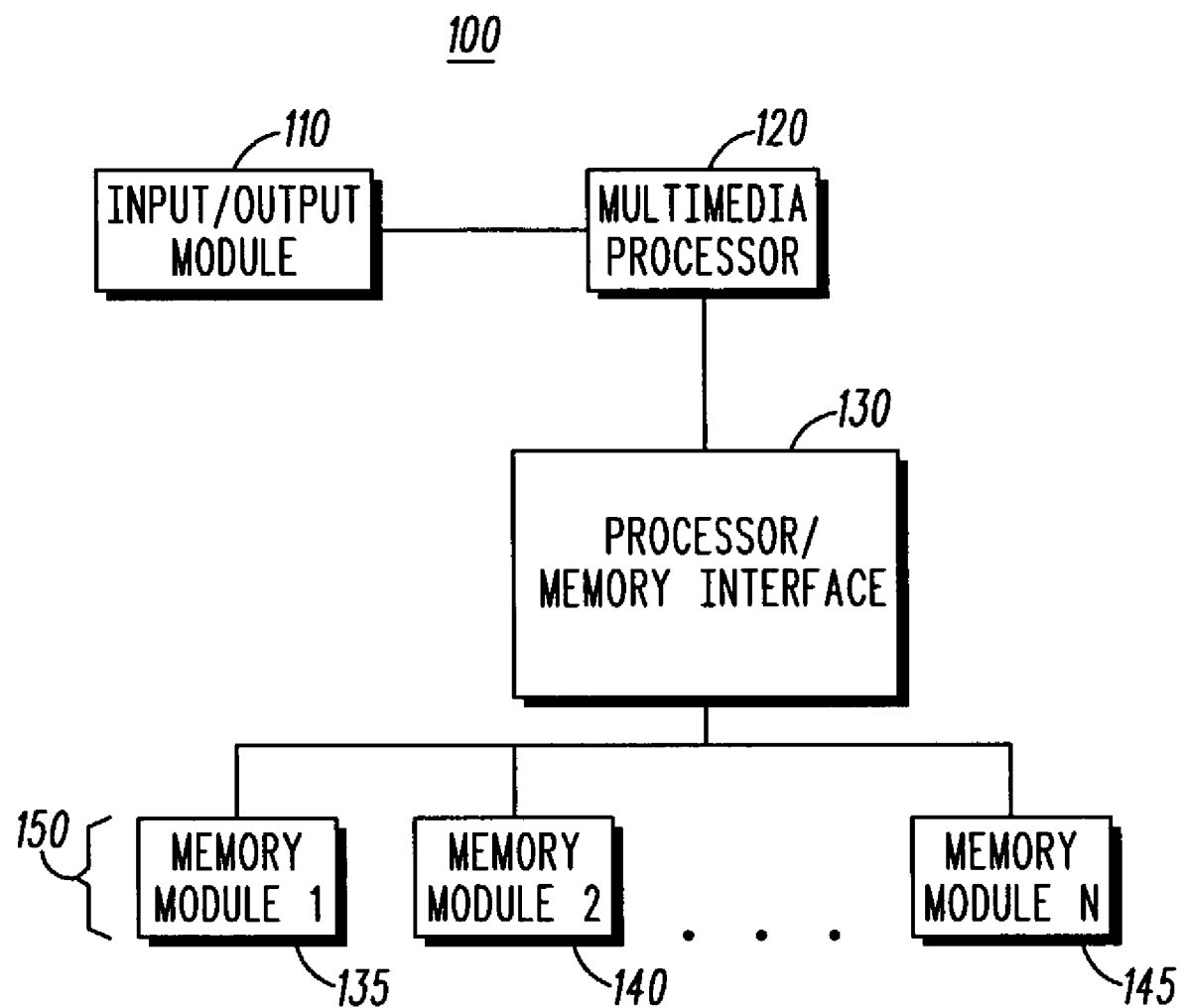
FIG. 1 is a general multimedia signal processing system, according to the prior art.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figures 2, 3:
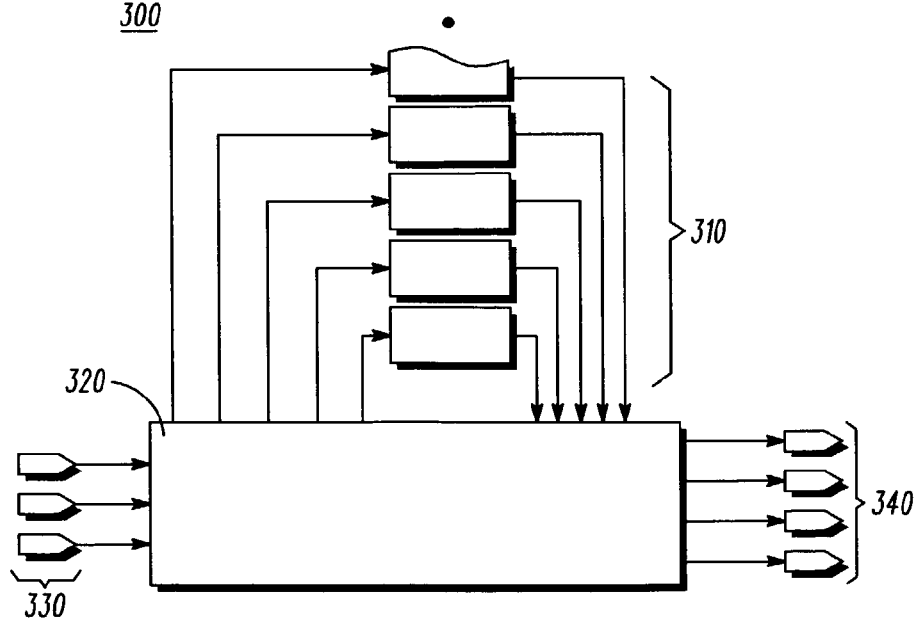
FIG. 2 is a diagram of an exemplary memory interface, according to a certain embodiment of the present invention.
FIG. 3 is a high level block diagram of the VMTU integration with a plurality of memory modules, according to a certain embodiment of the present invention.

Referring now to FIG. 2, a diagram of an exemplary memory interface 200 is shown, according to a certain embodiment of the present invention. A two dimensional array of macroblocks 260 is shown, where a representative macroblock 250 of the two dimensional array of macroblocks 260 further comprises a repeating pattern of memory element of memory module A 210, memory element of memory module B 220, memory element of memory module C 230, and memory element of memory module D 240. The four memory modules are oriented within a macroblock so that contiguous memory modules represent distinct memory elements. So, in the exemplary embodiment of FIG. 2, an element of memory module A 210 is not adjacent to any other element of memory module A 210. It is noted that the memory orientation shown in FIG. 2 is exemplary, and other memory arrangements are possible without departing from the spirit and scope of the present invention. For example, more than four memory modules could be used while still maintaining a separation between elements of a same memory module. It is also possible that the memory modules can be represented within a macroblock of the two dimensional array of macroblocks without using a repeating pattern of memory elements within the macroblock. It is also possible that the array of macroblocks have a dimensionality greater than two without departing from the spirit and scope of the present invention.

A user interfacing with the two dimensional array of macroblocks 260 may specify the two dimensional coordinates of an element within the two dimensional array of macroblocks 260. This coordinate specification is simpler than requiring the programmer to directly specify a physical memory address of the memory location represented by the element within the two dimensional array of macroblocks 260. An additional benefit of using a Cartesian coordinate representation of memory elements within one or more memory modules is that multiple memory elements from multiple memory modules may be concurrently returned to the user after the user requests a single memory element. The concurrent return of multiple memory elements from multiple memory modules increases a processing bandwidth of a system incorporating the two dimensional array of macroblocks 260, since multiple memory requests may be performed on a single clock cycle. As an example, referring again to FIG. 2, a user may select the lower left D memory element from macroblock 260 and one or more memory elements can then be selected and returned to the user. These one or more memory elements need not be in the same macroblock of the two dimensional array of macroblocks 260. In a preferred embodiment of the present invention, a single two dimensional coordinate selection results in a quad group, the top two memory elements within a quad group, or the bottom two elements within a quad group being selected, where a quad group represents a single contiguous memory element from each memory module (an example is the ABCD macroblock 250 of FIG. 2).

Referring now to FIG. 3 a high-level block diagram 300 of a Virtual Memory Translation Unit (VMTU) integration with a plurality of memory modules is shown, according to a certain embodiment of the present invention. Memory requests are received on a plurality of input ports 330 by VMTU 320. VMTU 320 processes these memory requests to produce a plurality of memory addresses, and communicates the plurality of memory addresses with a corresponding plurality of memory modules 310. The plurality of memory modules 310 returns a plurality of data requested by VMTU 320 corresponding to the plurality of memory addresses. VMTU 320 then routs the plurality of data onto a plurality of output ports 340. In a preferred embodiment of the present invention, memory requests received by the plurality of input ports 330 may be in linear mode (direct memory addresses), or in xy coordinate mode without departing from the spirit and scope of the present invention. If a memory request is in linear mode, then VMTU 320 passes this memory request directly to a memory module of the plurality of memory modules. If a memory request is in xy coordinate mode, then VMTU 320 first translates the memory request to an address readable by a memory module of the plurality of memory modules. One of skill in the art will recognize that while xy coordinates are discussed, the present invention may be implemented in three or more dimensions without departing from the spirit and scope of the present invention.

Figure 4:
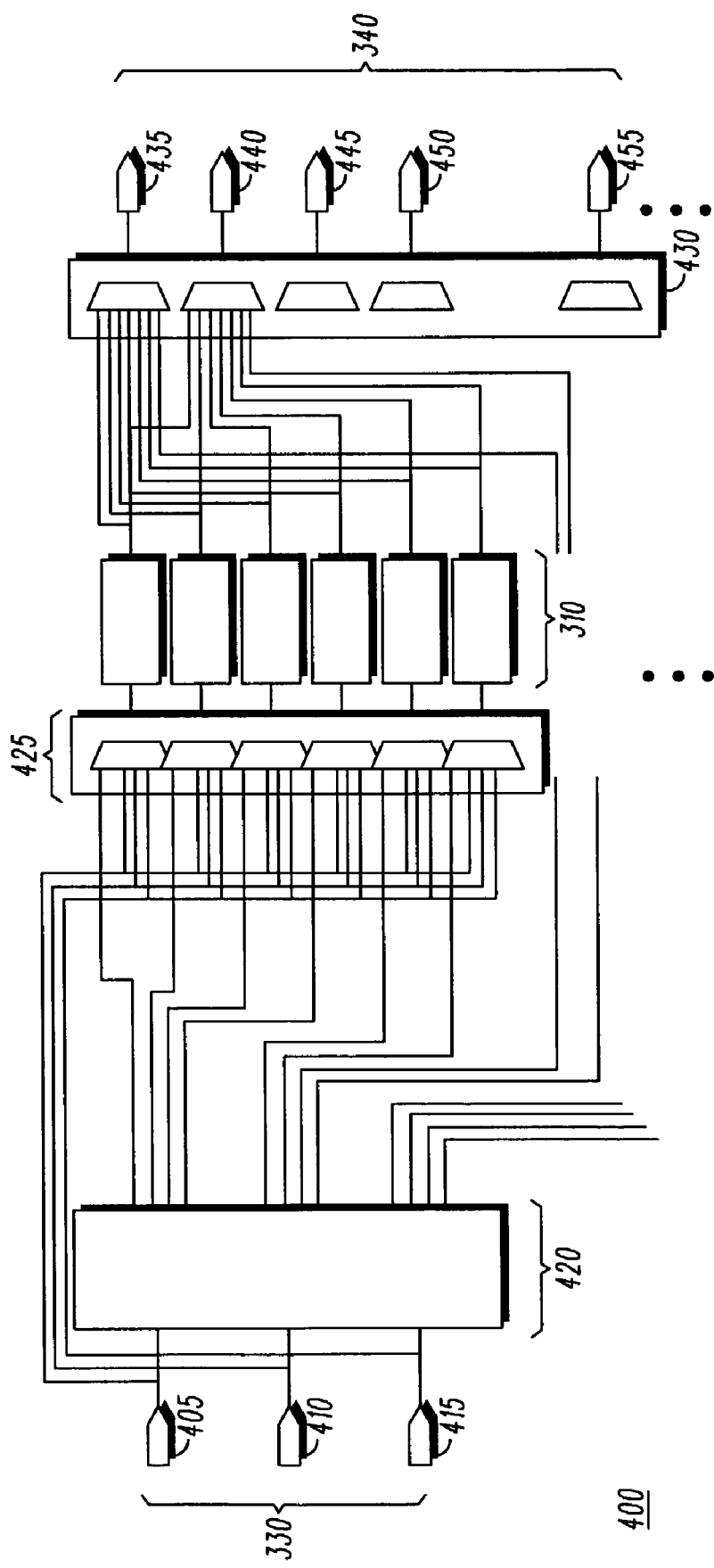
FIG. 4 is a more detailed block diagram of the VMTU integration with a plurality of memory modules, according to a certain embodiment of the present invention.

Referring now to FIG. 4 a more detailed block diagram 400 of the VMTU integration with a plurality of memory modules is shown, according to a certain embodiment of the present invention. Input ports 330, comprising input port 405, input port 410, and input port 415, are coupled to an xy to linear address generator block 420. xy to linear address generator block 420 further comprises a plurality of xy to linear address generators, where each xy to linear address generator of the plurality of xy to linear address generators is coupled to a corresponding input port. Each xy to linear address generator of the plurality of xy to linear address generators receives as input an xy address, a control signal indicating which memory macroblock the xy address corresponds to, and a flag indicating the number of associated memory elements that are to be accessed in addition to the specified xy address. The outputs of xy to linear address generator block 420 are coupled to a multiplexer block 425. Multiplexer block 425 determines which memory module of the plurality of memory modules 310 a particular xy address corresponds to. The plurality of memory modules 310 output the data corresponding to the plurality of memory addresses and a plurality of control signals received from multiplexer block 425. The data output from the plurality of memory modules 310 is coupled to a multiplexer block 430. Multiplexer block 430 uses the plurality of control signals to couple the data to the plurality of output ports 340. In a preferred embodiment of the present invention, xy to linear address generator block 240, multiplexer block 425, and multiplexer block 430 are contained within VMTU 320.

Figure 5:
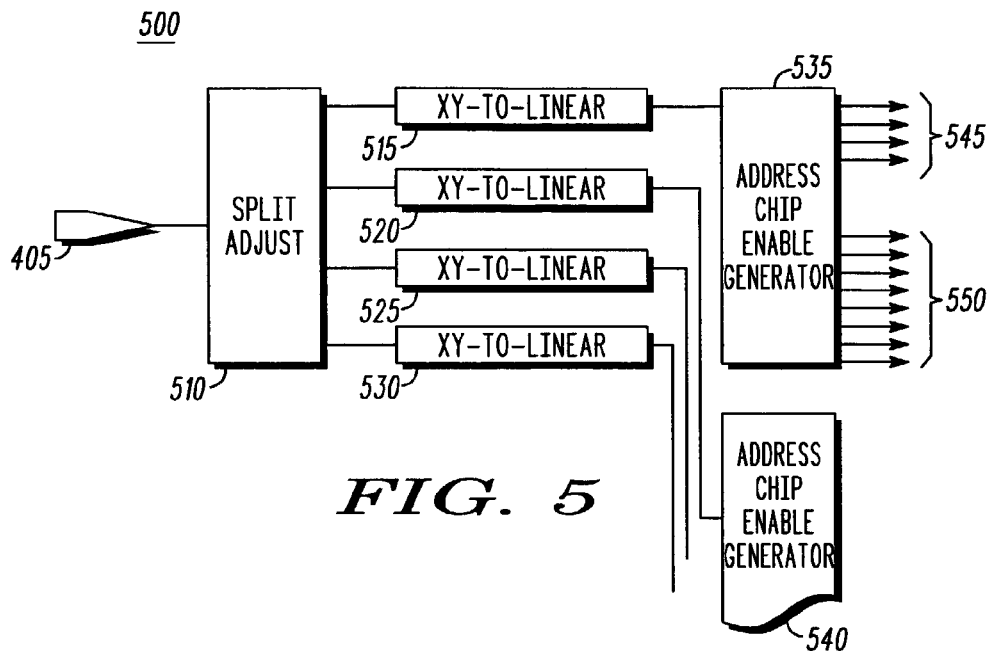
FIG. 5 is a diagram of,the address generator logic for a single port, according to a certain aspect of the present invention.

Referring now to FIG. 5, a diagram of the address generator logic 500 for a single port is shown, according to a certain aspect of the present invention. An xy address is received by this port via input port 405. Split adjust block 510 receives the xy address from input port 405. Split adjust block 510 processes the xy address and outputs xy addresses corresponding to a top-left pixel. In a preferred embodiment of the present invention split adjust block 510 contains two incrementors to perform the split adjust. The top left pixel is then coupled to an xy to linear converter 515, a top-right pixel which is then coupled to an xy to linear converter 520, a bottom left pixel which is then coupled to an xy to linear converter 525, and a bottom right pixel which is then coupled to an xy to linear converter 530. Each of the xy to linear converters (515, 520, 525, 530) rearrange bits to generate linear addresses from the input xy address. xy to linear converters 515, 520, 525, and 530 are coupled to a address/chip enable generator 535. Address/chip enable generator 535 takes linear addresses as input and outputs corresponding physical memory addresses 545 and a plurality of chip enable signals 550 for the corresponding plurality of memory modules 310. In a preferred embodiment of the present invention, address/chip enable generator 535 and address/chip enable generator 540 determine physical memory addresses by rearranging the bits of the output of xy to linear converters 515, 520, 525, 520.

It should be noted that one of skill in the art will recognize that although split adjust block 510 outputs four xy address for a given input xy address, any number of xy addresses could be determined relative to a given xy address without departing from the spirit and scope of the present invention. It is also noted that the output xy addresses of split adjust block 510 can be non-contiguous without departing from the spirit and scope of the present invention.

Figure 6:
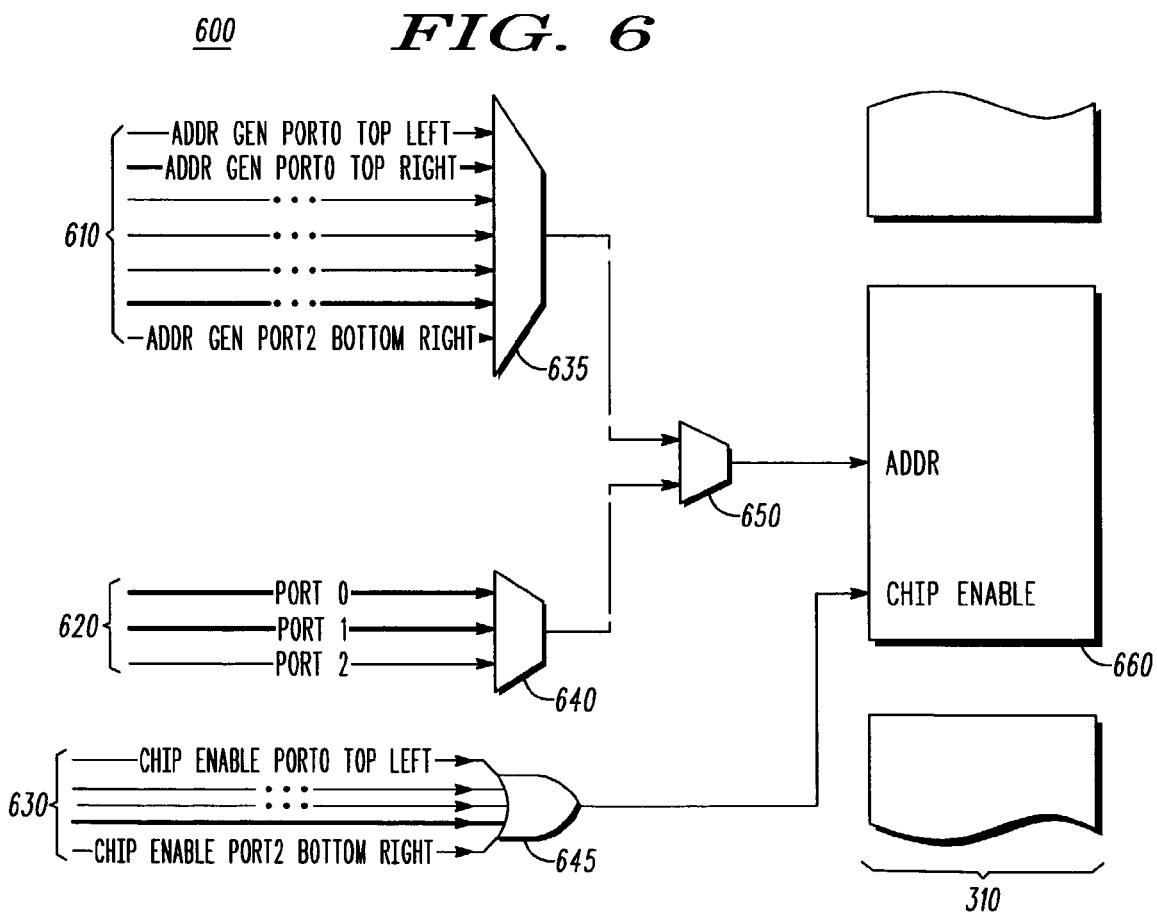
FIG. 6 is a schematic diagram of the input logic coupled to the plurality of memory modules, according to a certain embodiment of the present invention.

Referring now to FIG. 6, a schematic diagram of the input logic 600 coupled to the plurality of memory modules 310 is shown, according to a certain embodiment of the present invention. Memory module 660 of the plurality of memory modules 310 is coupled to a multiplexer 650. Multiplexer 650 receives as input one or more linear addresses 620 coupled at multiplexer 640, as well as one or more generated addresses 610 coupled at multiplexer 635. Memory module 660 also receives one or more chip select or enable signals 630 that are combined in an OR block 645. In a preferred embodiment of the present invention, each memory module of the plurality of memory modules 310 is coupled to one or more translated addresses similar in form to the one or more translated addresses 610 and one or more linear addresses similar in form to the one or more linear addresses 630. In a preferred embodiment of the present invention, multiplexer 640 and multiplexer 650 are coupled to the one or more chip enable signals 630. When a chip enable signal of the one or more chip enable signals 630 is active, the corresponding address is passed to memory module 660. Memory module 660 also receives the chip enable signal via OR block 645.

Referring now to FIG. 7, a schematic diagram of the output logic 700 coupled to the plurality of memory modules 310 is shown, according to a certain embodiment of the present invention. A plurality of output data 710 is transmitted from the plurality of memory modules 310 to multiplexer 725. Linear data 720 is then coupled to the output of multiplexer 725 at multiplexer 730. It is noted that one of skill in the art will realize that the number of inputs to multiplexer 725 and multiplexer 730 is exemplary, and a different number of output data from the plurality of memory modules 310 could be used without departing from the spirit and scope of the present invention. It is further noted that linear data 720 is coupled to multiplexer 730 since certain embodiments of the present invention allow the programmer or user to bypass the VMTU and use the linear addresses.

The output of multiplexer 730 is then coupled to output port 740 of one or more output ports. In accordance with certain embodiments of the present invention, each output port of the one or more output ports may operate in linear or VMTU mode. In a preferred embodiment of the present invention, each port of the one or more output ports determines linear mode or VMTU mode independent of the remaining one or more output ports. It should also be noted that the output of one or more of multiplexer 725 and multiplexer 730 is determined by the value of one or more corresponding enable signals. It is also noted that one of skill in the art will recognize that different output ports of the one or more output ports may be operable to output different parts of the plurality of memory modules 310 without departing from the spirit and scope of the present invention.

Referring now to FIG. 8, a flow diagram of a VMTU read operation 800 is shown, according to a certain embodiment of the present invention. As in block 810, a programmer or agent external to the VMTU passes an xy address to the VMTU. The xy address is split into multiple xy addresses (block 820), and each of the split xy addresses are translated into a linear address plus an enable, or chip select signal (block 830). The plurality of enable signals are used to determine the correct memory location within the plurality of memory modules 310 where the read operation is to occur. At each memory module of the plurality of memory modules 310, the plurality of enable signals are used to select between one or more linear addresses corresponding to physical memory locations within each memory module of the plurality of memory modules 310 (block 840). The plurality of enable signals are then used to select the correct memory module for each output port (block 850). The read data is then returned on the plurality of output ports (block 860).

Referring now to FIG. 9, a flow diagram of a VMTU write operation 900 is shown, according to a certain embodiment of the present invention. As in block 910, a programmer or agent external to the VMTU sends an xy address as well as one or more data to the VMTU. The xy address is split into multiple xy addresses (block 920), and each of the split xy addresses are translated into a linear address plus an enable, or chip select signal (block 930). The plurality of enable signals are used to determine the correct memory location where the write operation is to occur. At each memory module of plurality of memory modules 310, the plurality of enable signals are used to select between one or more linear addresses corresponding to physical memory locations within each memory module of the plurality of memory modules 310 (block 940). The plurality of enable signals are then used to select the correct memory module for each input data (block 950). Each of the one or more write data is then written to the appropriate memory location (block 860).

It is noted that a pipelined instruction architecture could also be used to provide the translation of one or more virtual addresses into accesses of one or more physical memories without departing from the spirit and scope of the present invention. The use of a pipeline allows the concurrent execution of one or more steps in the translation of the one or more virtual addresses into one or more physical addresses. In a certain embodiment of the present invention, the pipeline is divided into three stages. During a first stage, an xy address is split into one or more xy addresses, each of the xy addresses are converted to a linear address, and if a write cycle is occurring then one or more write data corresponding to the xy addresses are routed to the correct memory locations. During a second stage, the physical memory locations are accessed to perform a plurality of write operations during a write cycle and a plurality of read operations during a read cycle. It is noted that in a preferred embodiment of the present invention, the plurality of read operations and the plurality of write operations do not overlap in time. During a third stage, a plurality of read data corresponding to the plurality of read operations are routed to a corresponding plurality of output ports. It is further noted that one of skill in the art will recognize that a different number of stages could be used and the functionality to perform the translation of the one or more virtual addresses into accesses of one or more physical memories could be separated into the stages in a different manner than just described without departing from the spirit and scope of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A system for the translation of one or more virtual addresses into one or more accesses to one or more physical memories, comprising:
   an input interface to the one or more physical memories, wherein an address of an element of a memory of the one or more physical memories is represented as a point in a Cartesian coordinate system and consecutive points in the Cartesian coordinate system are operable to represent memory addresses corresponding to elements from different physical memories of the one or more physical memories;
   a virtual memory translator coupled to the input interface, wherein the virtual memory translator is operable to translate one or more points in the Cartesian coordinate system into one or more corresponding physical memory addresses, wherein the virtual memory translator further comprises:
      a split adjust block that determines the Cartesian coordinates of one or more selected points in the Cartesian coordinate system relative to the particular point;
      a Cartesian-to-linear address conversion mechanism; and
      a memory enable mechanism coupled to the Cartesian-to-linear address conversion mechanism that is operable to output the physical memory address of each of the selected points;
   a physical memory interface to the one or more physical memories, said physical memory interface coupled to the virtual memory translator and operable to perform one or more of:
      read one or more read data located in one or more physical memory addresses corresponding to one or more points in the Cartesian coordinate system; and
      write one or more write data to the one or more physical memory addresses corresponding to one or more points in the Cartesian coordinate system.

2. The system of claim 1, wherein the Cartesian coordinate system is 2-dimensional.

3. The system of claim 2, wherein the 2-dimensional coordinate system is represented as a rectangular array of pixels, where each pixel represents a single point in 2-dimensional Cartesian coordinates.

4. The system of claim 1, wherein upon a reference to a particular point in the Cartesian coordinate system, the virtual memory translator determines the physical address of the particular point in the Cartesian coordinate system as well as one or more physical addresses of one or more corresponding points in the Cartesian coordinate system, thereby providing for multiple memory accesses within one clock cycle.

5. The system of claim 4, wherein the one or more points in the Cartesian coordinate system are adjacent to the particular point.

6. The system of claim 4, wherein the memory element corresponding to the physical address of the particular point and the one or more memory elements of the one or more corresponding physical addresses are returned to the physical interface at the same time.

7. The system of claim 1, wherein the physical memory read operation further comprises:
   representing a point in the Cartesian coordinate system into one or more read Cartesian coordinate points;
   translating each of the one or more read Cartesian coordinate points into a linear memory address plus an enable signal for a corresponding memory of the one or more physical memories;
   using the enable signal to select the appropriate physical memory corresponding to a read Cartesian coordinate point of the one or more read Cartesian coordinate points;
   using the enable signal to select the appropriate physical memory for output; and
   returning the one or more read data contained in the appropriate physical memory.

8. The system of claim 1, wherein the physical memory write operation further comprises:
   obtaining the one or more write data corresponding to one or more physical memory locations where the one or more write data is to be written;
   representing a point in the Cartesian coordinate system into one or more write Cartesian coordinate points;
   translating each of the one or more write Cartesian coordinate points into a linear memory address plus an enable signal for a corresponding memory of the one or more physical memories;
   using the enable signal to select the appropriate physical memory corresponding to a write Cartesian coordinate point of the one or more write Cartesian coordinate points;
   using the enable signal to select the appropriate physical memory for output; and
   writing the one or more write data to the appropriate physical memory.

9. The system of claim 1, wherein the translation of one or more virtual addresses into one or more accesses to one or more physical memories is performed using an instruction pipeline.

10. The system of claim 9, wherein the instruction pipeline comprises a first, second, and third stage, and wherein during the first stage the one or more selected points in the Cartesian coordinate system are translated into one or more corresponding physical memory addresses and one or more write data are routed during a write cycle to the one or more corresponding physical memory addressed, during a second stage the one or more memory locations are accessed, and during a third stage one or more read data are routed during a read cycle.

11. A system for the translation of one or more virtual addresses into one or more accesses to one or more physical memories during a single clock cycle, comprising:
   an input interface to the one or more physical memories, wherein an address of an element of a memory of the one or more physical memories is represented as a pixel in a 2-dimensional Cartesian coordinate system and consecutive pixels in the 2-dimensional Cartesian coordinate system are operable to represent memory addresses corresponding to elements from different physical memories of the one or more physical memories;

a virtual memory translator coupled to the input interface, wherein the virtual memory translator is operable to translate one or more pixels in the 2-dimensional Cartesian coordinate system into one or more corresponding physical memory addresses, wherein the virtual memory translator further comprises:
  a split adjust block that determines the 2-dimensional Cartesian coordinates of one or more selected pixels in the 2-dimensional Cartesian coordinate system relative to the particular pixel;
  a Cartesian-to-linear address conversion mechanism; and
  a memory enable mechanism coupled to the Cartesian-to-linear address conversion mechanism that is operable to output the physical memory address of each of the selected pixels;
a physical memory interface to the one or more physical memories, said physical memory interface coupled to the virtual memory translator and operable to perform one or more of:
  read one or more read data located in one or more physical memory addresses corresponding to one or more pixels in the 2-dimensional Cartesian coordinate system during the clock cycle; and
  write one or more write data to the one or more physical memory addresses corresponding to one or more pixels in the 2-dimensional Cartesian coordinate system during the clock cycle.

12. The system of claim 11, wherein the physical memory read operation further comprises:
  representing a pixel in the 2-dimensional Cartesian coordinate system into one or more read Cartesian coordinate pixels;
  translating each of the one or more read Cartesian coordinate pixels into a linear memory address plus an enable signal for a corresponding memory of the one or more physical memories;
  using the enable signal to select the appropriate physical memory corresponding to a read Cartesian coordinate pixel of the one or more read Cartesian coordinate pixels;
  using the enable signal to select the appropriate physical memory for output; and
  returning the one or more read data contained in the appropriate physical memory.

13. The system of claim 11, wherein the physical memory write operation further comprises:
  obtaining the one or more write data corresponding to one or more physical memory locations where the one or more write data is to be written;
  representing a pixel in the 2-dimensional Cartesian coordinate system into one or more write Cartesian coordinate pixels;
  translating each of the one or more write Cartesian coordinate pixels into a linear memory address plus an enable signal for a corresponding memory of the one or more physical memories;
  using the enable signal to select the appropriate physical memory corresponding to a write Cartesian coordinate pixel of the one or more write Cartesian coordinate pixels;
  using the enable signal to select the appropriate physical memory for output; and
  writing the one or more write data to the appropriate physical memory.

14. A method for the translation of one or more virtual addresses into one or more accesses to one or more physical memories, comprising:
  representing each address of each element of a memory of the one or more physical memories as a point in a Cartesian coordinate system wherein consecutive points in the Cartesian coordinate system are operable to represent virtual memory addresses corresponding to elements from different physical memories of the one or more physical memories;
  translating one or more selected points in the Cartesian coordinate system into one or more corresponding physical memory addresses, wherein the virtual memory translator further comprises:
    a split adjust block that determines the 2-dimensional Cartesian coordinates of one or more selected pixels in the 2-dimensional Cartesian coordinate system relative to the particular pixel;
    a Cartesian-to-linear address conversion mechanism; and
    a memory enable mechanism coupled to the Cartesian-to-linear address conversion mechanism that is operable to output the physical memory address of each of the selected pixels;
  performing one or more of:
    reading one or more read data located in one or more physical memory addresses corresponding to one or more selected points in the Cartesian coordinate system; and
    writing one or more write data to the one or more physical memory addresses corresponding to one or more selected points in the Cartesian coordinate system.

15. The method of claim 14, wherein the Cartesian coordinate system is 2-dimensional and the 2-dimensional coordinate system is represented as a rectangular array of pixels, where each pixel represents a single point in 2-dimensional Cartesian coordinates.

16. The method of claim 14, further comprising determining one or more physical addresses of one or more corresponding points in the Cartesian coordinate system when a single point in the Cartesian coordinate system is selected.

17. The method of claim 16, wherein the one or more corresponding points in the Cartesian coordinate system are adjacent to the single point.

18. The method of claim 16, further comprising determining the memory element corresponding to the physical address of the single point and the one or more memory elements of the one or more corresponding physical addresses during the same clock cycle.

19. The method of claim 14, wherein translating the one or more selected points in the Cartesian coordinate system into one or more corresponding physical memory addresses further comprising:
  determining Cartesian coordinates of one or more selected points in the Cartesian coordinate system relative to a particular point;
  converting the one or more selected points in the Cartesian coordinate system into one or more corresponding linear addresses; and
  determining a physical memory address of each of the Cartesian points of the one or more selected points in the Cartesian coordinate system.

20. The method of claim 14, wherein the physical memory read operation further comprises:

representing a point of the one or more selected points in the Cartesian coordinate system into one or more distinct Cartesian coordinate points;

translating each of the one or more distinct Cartesian coordinate points into a linear memory address plus an enable signal for a corresponding memory of the one or more physical memories;

using the enable signal to select the appropriate physical memory corresponding to a Cartesian coordinate point of the one or more distinct Cartesian coordinate points;

using the enable signal to select the appropriate physical memory for output; and returning one or more read data contained in the appropriate physical memory corresponding to the one or more distinct Cartesian coordinate points.

21. The method of claim 14, wherein the physical memory write operation further comprises:

obtaining one or more write data where the one or more write data is to be written to one or more physical memory locations;

representing a point in the Cartesian coordinate system into one or more write Cartesian coordinate points;

translating each of the one or more write Cartesian coordinate points into a linear memory address plus an enable signal for a corresponding memory of the one or more physical memories;

using the enable signal to select the appropriate physical memory corresponding to a Cartesian coordinate point of the one or more write Cartesian coordinate points;

using the enable signal to select the appropriate physical memory for output; and writing a data of the one or more write data to the appropriate physical memory corresponding to the appropriate physical memory determined by the enable signal.

22. The method of claim 14, wherein translating the one or more virtual addresses into one or more accesses to one or more physical memories uses an instruction pipeline.

23. The method of claim 22, further comprising during a first stage translating the one or more selected points in the Cartesian coordinate system into one or more corresponding physical memory addresses and routing one or more write data during a write cycle, during a second stage accessing the one or more memory locations, and during a third stage routing one or more read data during a read cycle.

24. A method for the translation of one or more virtual addresses into one or more accesses to one or more physical memories during a single clock cycle, comprising:

representing an address of an element of a memory of the one or more physical memories as a pixel in a 2-dimensional Cartesian coordinate system and representing consecutive pixels in the 2-dimensional Cartesian coordinate system as memory addresses corresponding to elements from different physical memories of the one or more physical memories;

translating one or more pixels in the 2-dimensional Cartesian coordinate system into one or more corresponding physical memory addresses, wherein translating one or more pixels in the 2-dimensional Cartesian coordinate system into one or more corresponding physical memory addresses further comprises:

determining the 2-dimensional Cartesian coordinates of one or more selected pixels in the 2-dimensional Cartesian coordinate system relative to a particular pixel:

performing an Cartesian-to-linear address conversion; and outputting the physical memory address of each of the selected pixels;

performing one or more of:

reading one or more read data located in one or more physical memory addresses corresponding to one or more pixels in the 2-dimensional Cartesian coordinate system during the clock cycle; and writing one or more write data to the one or more physical memory addresses corresponding to one or more pixels in the 2-dimensional Cartesian coordinate system during the clock cycle.

25. The method of claim 24, wherein the physical memory read operation further comprises:

representing a pixel in the 2-dimensional Cartesian coordinate system into one or more read Cartesian coordinate pixels;

translating each of the one or more read Cartesian coordinate pixels into a linear memory address plus an enable signal for a corresponding memory of the one or more physical memories;

using the enable signal to select the appropriate physical memory corresponding to a read Cartesian coordinate pixel of the one or more read Cartesian coordinate pixels;

using the enable signal to select the appropriate physical memory for output; and returning the one or more read data contained in the appropriate physical memory.

26. The method of claim 24, wherein the physical memory write operation further comprises:

obtaining the one or more write data corresponding to one or more physical memory locations where the one or more write data is to be written;

representing a pixel in the 2-dimensional Cartesian coordinate system into one or more write Cartesian coordinate pixels;

translating each of the one or more write Cartesian coordinate pixels into a linear memory address plus an enable signal for a corresponding memory of the one or more physical memories;

using the enable signal to select the appropriate physical memory corresponding to a write Cartesian coordinate pixel of the one or more write Cartesian coordinate pixels;

using the enable signal to select the appropriate physical memory for output; and writing the one or more write data to the appropriate physical memory.

* * * * *